No. 835,501. PATENTED NOV. 13, 1906.
H. O. CHUTE.
PROCESS OF MAKING ACETATES.
APPLICATION FILED MAR. 28, 1906.
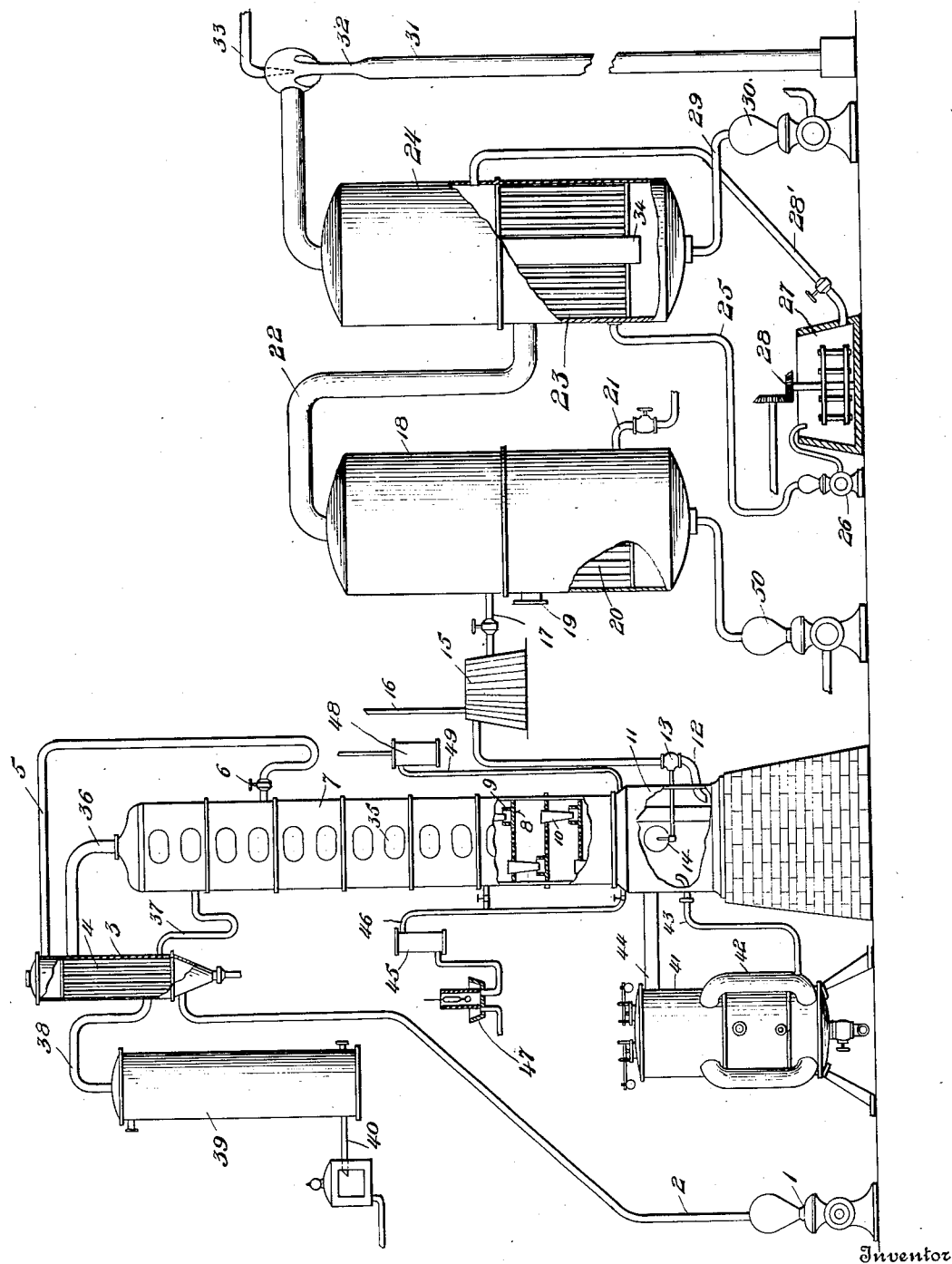
Witnesses
Alfred M. Houghton.
BM. Offutt.
Inventor
H. O. Chute
By
Mark & McElroy
Attorneys

UNITED STATES PATENT OFFICE.

HARRY O. CHUTE, OF CLEVELAND, OHIO.

PROCESS OF MAKING ACETATES.

No. 835,501.      Specification of Letters Patent.      Patented Nov. 13, 1906.

Application filed March 28, 1906. Serial No. 308,424.

*To all whom it may concern:*

Be it known that I, HARRY O. CHUTE, a citizen of the United States, residing in Cleveland, county of Cuyahoga, and State of Ohio, have invented certain new and useful Improvements in Processes of Making Acetates; and I hereby declare the following to be a full, clear, and exact description of the invention, such as will enable others skilled in the art to which it appertains to practice and use the same.

This invention relates to processes of making acetates; and it consists in a succession of distillatory and other steps converting crude pyroligneous acid into merchantable acetates, all as more fully hereinafter set forth, matters of novelty being particularly pointed out in the appended claims.

Pyroligneous acid, or the watery portion of the products of the destructive distillation of wood, consists, essentially, of a solution of acetic acid, methyl alcohol, and acetone in water; but it contains also a wide variety of other substances partly held in suspension and partly in solution. Among these are a number of acids other than acetic, ketones of varied nature, aldehydes, suspended and dissolved "tar," phenols, hydrocarbons, &c. Many of these bodies which are normally insoluble in water or in one or other of the principal constituents are held in solution by the solvent properties of the mixture. Others are held in suspension or pseudo solution. Aside from the acetic acid, acetone, and methyl alcohol very little is known as to the chemical character of these bodies. The methyl alcohol and the acetone, together with more or less of the other volatile neutral bodies, form what is known as "wood-spirit" in commerce.

There are many and crude processes now in use for working up the pyroligneous acid to obtain merchantable products.

It is my object to provide a simple, cheap, and ready method directly giving comparatively high-grade products.

One of the methods of the prior art is to neutralize the whole body of liquid, customarily with lime or soda, and distil. This gives a distillate, from which the wood-spirit can be recovered, and the residue in the still on complete evaporation yields what is known as "brown acetate"—*i. e.*, real acetate contaminated with a large amount of tar, both that preëxisting and that formed by the reaction of the alkalies on certain constituents—with lime or soda compounds of the phenols and other acid constituents, &c. The methyl alcohol and acetone, particularly the former, are not much influenced in this process; but owing to the detrimental action of alkalies upon aldehydes and higher ketones these latter bodies are more or less resinified and polymerized, adding materially to the amount of tar which contaminates the acetate. In the subsequent working up of the brown acetate the excess of lime necessarily employed to neutralize the acids, phenols, tarry products, resinified condensation products, &c., requires the use of considerably more acid, sulfuric or hydrochloric, than would otherwise be necessary. Another method much in use consists in directly distilling off the acetic acid and the wood-spirit together from the non-volatile impurities of the crude pyroligneous acid. For this purpose the whole mass of such acid is distilled. The tar and all the bodies not directly volatile in acid solution or at the boiling temperature of acetic acid remain behind in the still. Those which are volatile under these circumstances go forward to contaminate the distilled acid. The condensate from this distillation is neutralized with lime or soda, as before, and redistilled. The alkali, however, exercises the same detrimental influence in this distillation upon these volatile impurities—aldehydes, ketones, &c.—as in the direct brown acetate manufacture, forming the same resinified tarry bodies to contaminate the acetate left in the still. I have, however, discovered that by a methodical distillation, taking advantage of the peculiar properties of these impurities, I can obtain relatively pure liquids, enabling me to make better grades of acetate. These impurities, I find, vary greatly in volatility, according to the conditions prevailing in the liquid from which distillation is proceeding. Certain of these resinifying and polymerizing impurities, like the aldehydes and ketones, though mostly possessing higher boiling-points than methyl alcohol and acetone, the principal constituents of wood-spirits, have nevertheless high vapor tensions and tend to distil with such spirit, particularly when the spirituous vapors are tolerably concentrated. The character of the liquid, however, makes an important difference in this respect, for at least some of these impurities are held back in alkaline or neutral solutions, but volatilize freely in acid solutions. By distilling off the wood-spirit in as concentrated a form as possible, which may be conveniently done by the use of ordinary column-stills, from the acid liquor I find that these impurities of high vapor tension can be accumulated in the condensate and the liquid in the still freed from them. Some of these impurities are not particularly soluble in said condensate and separate from it when its strength is above certain ranges, but they distil freely with it. In ordinary practice the first and most concentrated portions flowing from the still commonly appear milky from separation of such impurities; but the milkiness disappears if the distillation be carried further and more liquid sent over to dilute and weaken the condensate. In this operation I prefer to carry on the distillation so as to obtain a distillate strong enough to be milky. Relieved of the solvent action of the wood-spirit which has been distilled away many of the impurities which have been held in suspension and solution tend to settle out. Others of the impurities of the crude pyroligneous acid which are volatile are of comparatively low vapor tension and do not distil with the spirit, though volatilizing and passing over with the acid, as stated in describing the gray-acetate method. I have discovered, however, that by careful distillation I can fractionate away the acid from the bulk of these impurities and that by distilling *in vacuo* the separation is easier and more complete. The vacuum may be complete or partial. In my present method, therefore, I first distil the pyroligneous liquor without making alkaline in a rectifying apparatus of any convenient type, so as to eliminate the wood-spirit and the codistilled impurities. The greater the concentration of the wood-spirit leaving the apparatus as a rule the greater is the amount of these high-vapor-tension impurities which I can eliminate therewith. The acid freed of the wood-spirit and the codistilled impurities is next settled and then boiled, preferably, as stated, *in vacuo*, to distil off the acid. The acid-vapors so formed are condensed, saturated with the base whose acetate is desired, but customarily with lime or soda, and the solution so formed evaporated to obtain the acetate in a crystallized state. By use of the acid-vapors as a heating agent for evaporating the acetate solution a marked economy is effected, and for this purpose I prefer to evaporate the acetate *in vacuo*.

In the accompanying illustration I show more or less diagrammatically one form of apparatus of the many adapted to perform my process.

In the illustration, 1 is an acid-pump delivering pyroligneous acid through pipe 2 to a preheater 3, containing a nest of tubes 4, through which it flows. Leaving the preheater through pipe 5, provided with valve 6, the acid enters the upper portion of distilling-column 7, provided with perforated shelves 8, cups 9, and downtake-tubes 10, and travels downward in a well-understood way until it enters the lower chamber 11. This chamber is provided with an exit-pipe 12, valved at 13, and provided with a float 14, regulating the valve. Through this pipe the acid is forced by the pressure in the still to equalizing and settling chamber 15, provided with a vent-pipe 16. From this chamber it is fed through valved pipe 17 into distilling apparatus 18, where the acid is boiled off by steam or other heating vapor entering through inlet 19, passing around tube-nest 20, and passing off condensed through pipe 21. The acid-vapors pass through pipe 22, around the heating-pipes 23 of a second evaporating apparatus 24, are there condensed, and removed through pipe 25 by means of a pump 26, delivering into tub 27, provided with stirring mechanism 28. The pump also serves to create whatever vacuum may be desired in the first pan. The acid is here neutralized by the use of any appropriate base, and the acetate solution formed is delivered by pipe 28' to the second evaporating apparatus, where it is evaporated by the heat of the acid-vapors and drawn off in the concentrated state by pipe 29 and pump 30. The necessary vacuum is maintained in this evaporating apparatus by means of customary water-leg 31, provided with a constriction 32 and water-jet device 33. In both these evaporating devices the tube-nest is provided with the customary down circulating-pipe 34. (Shown only in the second.)

Returning to the still, this is provided with manholes 35, through which the cups and downtake-tubes can be cleaned or removed, if made removable, this structure being necessary for the reason that tar is liable to accumulate in these elements. The wood-spirit vapors formed in this still leave through pipe 36, pass around the tubes of the preheater, where a portion of the water is condensed out under the influence of the inflowing cold or relatively cold acid, and returned to the still through the gooseneck 37 for retreatment, since it of course carries more or less of the spirit. The uncondensed vapors leave the preheater through pipe 38, are condensed in the condenser 39, and exit through pipe 40.

The heat necessary for running the still is furnished in a separate boiler 41, heated by steam passing around a nest of internal tubes (Not shown.) The necessary circulation in this heater instead of being furnished by a large central tube, as in the evaporators, is furnished by external air-cooled tubes 42. Tar-free liquor is drawn off from near the surface of the liquid in the bottom chamber of the still by means of a pipe 43, boiled in the heater, and the vapors returned to said chamber by means of pipe 44.

In order to follow the progress of the distillation in the still, I provide it with a testing device consisting of a condenser 45, communicating with the still at various points (two are shown) by means of a valved pipe connection 46. The condensate from this passes into a hydrometer-jar 47. The pressure in the still may be estimated by the manometric device 48, connected with the steam-space of the bottom chamber by means of pipe 49. Pressure and temperature of course correspond.

Tar accumulating in the acid-still 18 may be removed from time to time by the tar-pump 50 or any other suitable means.

The pressure in the still is sufficient to force liquid into the equalizing-tank 15.

When, as is usually the case, the acid-distilling apparatus 18 is operated under a partial vacuum, steam or other heating vapor of ordinary atmospheric pressure or exhaust-steam may be used to heat pipe-nest 20. Use of vacuum in the acid-still promotes the volatilization of acetic acid to a greater extent than that of high-boiling impurities, and therefore aids in fractionation here.

In the operation of the column-still 7 the liquid drawn off from the bottom chamber 11 of the column is boiled in boiler 41, and the vapors which are free of spirit return through pipe 44 into said chamber and thence upward through the column against the descending acid, distilling the spirit and the low-boiling bodies therefrom in the well-understood way. The inflowing liquid is delivered at a point in the column where the average richness in spirit and acid of the liquid under treatment in the column is about the same as its own richness in those substances.

To recapitulate, my process in its present preferred form as carried out by the above-described apparatus and similar apparatus consists in distilling off from non-neutralized pyroligneous acid the wood-spirit in concentrated form and therewith the impurities of high vapor tension settling out separated insoluble impurities, boiling the purified acid, preferably *in vacuo*, to distil it from high-boiling impurities, condensing the vapors, neutralizing, ordinarily with lime, and evaporating the acetate solution formed, preferably, also, *in vacuo*, and by the heat from the acid-vapors. In this vacuum operation the vacuum maintained in the first or acid-distilling chamber is of course less than that in the second or acetate-evaporating chamber.

What I claim is—

1. The process of preparing acetates which consists in freeing pyroligneous acid of volatile impurities, removing separated insoluble impurities, boiling off the acid to separate the same from less volatile impurities, condensing the acid-vapors, neutralizing and evaporating the resultant acetate solution by the heat of said condensing acid-vapors.

2. The process of preparing acetates which consists in distilling volatile impurities and wood-spirit away from crude pyroligneous acid maintained under plus pressure, removing separated insoluble impurities, distilling away relatively pure acetic acid from less volatile, heat-sensitive impurities under reduced pressure and at relatively low temperature, and thereafter condensing and neutralizing the acid to form acetates.

3. The process of preparing acetates which consists in fractionating off wood-spirit in concentrated form from pyroligneous acid to remove impurities of high vapor tension, removing separated insoluble impurities, boiling off the acid to remove the same from less volatile impurities, condensing the acid-vapors, neutralizing and evaporating the resultant acetate solution by the heat of said condensing acid-vapors.

4. The process of preparing acetates which consists in fractionating off the wood-spirit in concentrated form from pyroligneous acid to remove impurities of high vapor tension, removing separated insoluble impurities, boiling off the acid *in vacuo* to remove the same from less volatile impurities, condensing the acid-vapors, neutralizing and evaporating the resultant acetate solution.

5. The process of preparing acetates which consists in removing impurities of high vapor tension from pyroligneous acid, removing separated insoluble impurities, boiling off the acid *in vacuo* to separate the same from less volatile impurities, condensing the acid-vapors in the heating-coils of a vacuum apparatus, maintained at a higher vacuum than that prevailing in the acid distillation, neutralizing the condensate, returning the neutralized condensate around said heating-coils and there evaporating it *in vacuo* by the heat of said condensing acid-vapors.

6. The process of preparing acetates which consists in removing impurities of high vapor tension from pyroligneous acid, removing separated insoluble impurities, boiling off the acid to separate the same from less volatile impurities, condensing the acid-vapors in the heating-chambers of an evaporator, maintained at less pressure than that prevailing in the acid distillation, neutralizing the condensate and returning the neutralized condensate to the evaporating-chamber of the apparatus under less pressure to be concentrated by the heat of said heating-chambers.

7. The process of preparing acetates which consists in distilling from pyroligneous acid the volatile impurities sensitive to alkali, removing separated impurities, distilling off the acetic acid from the thus purified liquid in a vacuum apparatus under partial vacuum and heated by steam at approximately atmospheric pressure, condensing the acid-vapors in the heating-chambers of a second and cooler vacuum apparatus maintained under a higher vacuum, withdrawing the condensate from said heating-chambers, neutralizing the condensate and returning to and passing through the evaporating-chamber of said cooler vacuum apparatus for concentration by the heat from said acid-vapors.

8. The process of preparing acetates which consists in boiling acetic acid, condensing the vapors in the heating-chambers of an evaporating-pan, removing and neutralizing the condensate, returning the neutralized condensate to the evaporating-chambers of the evaporating-pan and there evaporating the said neutralized condensate by the heat of condensing acid-vapors.

In testimony whereof I affix my signature in the presence of two witnesses.

HARRY O. CHUTE.

Witnesses:
K. P. McELROY,
ALFRED M. HOUGHTON.